US012729852B2

(12) United States Patent
Sano et al.

(10) Patent No.: US 12,729,852 B2
(45) Date of Patent: Sep. 8, 2026

(54) COMBUSTIBLE WASTE TREATMENT METHOD

(71) Applicant: Taiheiyo Cement Corporation, Tokyo (JP)

(72) Inventors: Yuya Sano, Tokyo (JP); Sho Shimoda, Tokyo (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 317 days.

(21) Appl. No.: 18/546,492

(22) PCT Filed: Mar. 10, 2021

(86) PCT No.: PCT/JP2021/009606
§ 371 (c)(1),
(2) Date: Aug. 15, 2023

(87) PCT Pub. No.: WO2022/190284
PCT Pub. Date: Sep. 15, 2022

(65) Prior Publication Data

US 2024/0133549 A1 Apr. 25, 2024
US 2024/0230083 A9 Jul. 11, 2024

(51) Int. Cl.
*F23D 23/00* (2006.01)
*F23G 5/08* (2006.01)
(Continued)

(52) U.S. Cl.
CPC ............... *F23G 5/08* (2013.01); *F23D 23/00* (2013.01); *F27B 7/10* (2013.01); *F23G 2209/28* (2013.01)

(58) Field of Classification Search
CPC ........ F23D 23/00; F23D 2205/00; F23G 5/20; F23G 5/444; F27B 7/10; F27B 7/2033; F27B 7/20
See application file for complete search history.

(56) References Cited

U.S. PATENT DOCUMENTS 6,318,278 B1 * 11/2001 Dugue .................. F27B 7/2033 432/106
8,974,226 B2 3/2015 Rheker
(Continued)

FOREIGN PATENT DOCUMENTS

JP S52-035478 A 3/1977
JP S57-055312 A 4/1982
(Continued)

OTHER PUBLICATIONS

Office Action issued in Japanese Application No. 2023-504985, dated Oct. 22, 2024.
(Continued)

*Primary Examiner* — Gregory A Wilson
(74) *Attorney, Agent, or Firm* — Knobbe, Martens, Olson & Bear, LLP

(57) ABSTRACT

Provided is a combustible waste treatment method capable of suppressing the falling rate of even combustible waste having relatively poor combustibility into a clinker during combustion.
The combustible waste treatment method includes: blowing first combustible waste having flammability into a kiln from a first waste burner disposed at a position vertically above a main burner blowing main fuel; and blowing second combustible waste having flame retardancy into the kiln from a second waste burner disposed at a position vertically above the first waste burner.

8 Claims, 6 Drawing Sheets

(51) Int. Cl.
*F23G 5/20* (2006.01)
*F27B 7/10* (2006.01)

(56) References Cited

U.S. PATENT DOCUMENTS

| | | | | |
|---|---|---|---|---|
| 11,029,025 | B2 * | 6/2021 | Sano | F23G 5/20 |
| 11,428,402 | B2 * | 8/2022 | Sano | C04B 7/45 |
| 2015/0232382 | A1 | 8/2015 | Rheker et al. | |
| 2017/0016670 | A1 * | 1/2017 | Grassi | C04B 7/4438 |
| 2021/0054996 | A1 | 2/2021 | Sano et al. | |

FOREIGN PATENT DOCUMENTS

| | | | | | |
|---|---|---|---|---|---|
| JP | H07-277788 | A | | 10/1995 | |
| JP | H07330395 | A | * | 12/1995 | |
| JP | H08-283052 | A | | 10/1996 | |
| JP | H9-196330 | A | | 7/1997 | |
| JP | H10-339417 | A | | 12/1998 | |
| JP | H11182825 | A | * | 7/1999 | |
| JP | 2001-114539 | A | | 4/2001 | |
| JP | 2003-090522 | A | | 3/2003 | |
| JP | 2003106508 | A | * | 4/2003 | C04B 7/4446 |
| JP | 2003-192406 | A | | 7/2003 | |
| JP | 2004-141716 | A | | 5/2004 | |
| JP | 2004292200 | A | * | 10/2004 | C04B 7/4423 |
| JP | 2006-038439 | A | | 2/2006 | |
| JP | 2007-046809 | A | | 2/2007 | |
| JP | 4026342 | B2 | * | 12/2007 | C04B 7/4446 |
| JP | 4099965 | B2 | * | 6/2008 | C04B 7/4407 |
| JP | 2008-222504 | A | | 9/2008 | |
| JP | 2012-202618 | A | | 10/2012 | |
| JP | 2013-237571 | A | | 11/2013 | |
| JP | 2015-535922 | A | | 12/2015 | |
| JP | 2017-122565 | A | | 7/2017 | |
| JP | 6674073 | B1 | * | 4/2020 | F23L 1/00 |
| JP | 2003130549 | A | * | 5/2023 | |
| WO | 2009/034626 | A1 | | 3/2009 | |
| WO | 2021/029032 | A1 | | 2/2021 | |

OTHER PUBLICATIONS

International Search Report issued in International Patent Application No. PCT/JP2021/009606, dated May 11, 2021 in 3 pages.
International Preliminary Report on Patentability issued in International Patent Application No. PCT/JP2021/009606, dated Sep. 21, 2023 in 6 pages.
Office Action issued in Vietnamese Application No. 1-2023-06301, dated Mar. 25, 2025.

* cited by examiner

COMBUSTIBLE WASTE TREATMENT METHOD

CROSS-REFERENCE TO RELATED APPLICATIONS

This application is the U.S. National Phase under 35. U.S.C. § 371 of International Application PCT/JP2021/009606, filed Mar. 10, 2021, the disclosure of which including the specification, the drawings, and the claims is hereby incorporated by reference in its entirety.

TECHNICAL FIELD

The present invention relates to a method for treating combustible waste, and more particularly to a method for treating combustible waste by charging the combustible waste together with main fuel into a rotary kiln and calcining the combustible waste.

BACKGROUND ART

Combustible wastes, such as waste plastics, wood chips, and automobile shredder residues (ASR), have heat quantities enough to use such combustible wastes as fuels for calcination. Therefore, there has been a promotion of effective utilization of combustible wastes as auxiliary fuels for pulverized coals, which are main fuels, in rotary kilns for use in cement clinker calcination. Hereinafter, such rotary kilns for use in cement clinker calcination may be merely referred to as "kilns."

Conventionally, when combustible wastes are charged into kilns, the combustible wastes have been used in kiln tails and calcining furnaces, which exert less influence on the quality of cement clinkers. However, when the wastes are charged from the kiln tails and the calcining furnaces, the post-burning of the wastes causes a gas temperature at the subsequent stage to increase, and thus, from the viewpoint of protecting equipment disposed at the subsequent stage, a water-spraying treatment is performed to lower the temperature to an appropriate temperature. As a result, since the basic unit of heat is reduced, it is necessary to perform treatments in kiln fronts to further charge the combustible wastes into the kilns.

The present applicant has developed a main burner in which a flow channel for combustible waste such as waste plastic is provided inside a flow channel for main fuel in a burner (hereinafter referred to as a "main burner") for blowing main fuel (pulverized coal) into a kiln (see Patent Document 1).

PRIOR ART DOCUMENT

Patent Documents

Patent Document 1: International Publication No. 2009/034626

Patent Document 2: JP-A-2001-114539

SUMMARY OF THE INVENTION

Problems to be Solved by the Invention

The amount of combustible waste received in a cement factory is expected to increase in the future, and therefore it is necessary to increase the cross-sectional area of the tip of the flow channel for waste plastic in order to enhance the treatment capacity of the combustible waste in the structure of Patent Document 1. However, in the structure of Patent Document 1, a flow channel for air is provided outside the flow channel for waste plastic, and therefore there is little room to increase the cross-sectional area of the tip of the flow channel for waste plastic.

As a method for enhancing the treatment capacity of the combustible waste while adopting the structure of Patent Document 1, a method for increasing the diameter of the entire main burner can be considered. However, when the entire main burner is enlarged, it is necessary to strengthen a supporting steel material supporting the main burner, increasing installation costs. Since the cross-sectional area of each flow channel provided in the main burner changes, it is necessary to redesign parameters (such as a solid-air ratio and a wind speed) at the time of operation. From such a viewpoint, it is difficult to introduce a method for simply increasing the size of the main burner in order to enhance the treatment capacity of the combustible waste.

From such a viewpoint, a method in which an auxiliary burner for combustible waste is provided separately from the main burner has been studied. Patent Document 2 discloses a combustion apparatus in which an auxiliary burner for combustible waste is installed at a position vertically above a main burner.

In the case of the structure disclosed in Patent Document 2, when the combustible waste to be introduced is combustible (flammable) waste such as pulverized soft waste plastic, it is considered that combustion can be performed without any particular problem. However, from the viewpoint of increasing the amount of waste accepted in a cement factory, it is preferable that waste having relatively poor flammability (flame retardancy) can also be accepted in the future as well as flammable waste. When flame-retardant waste is charged from the auxiliary burner for combustible waste in the combustion apparatus disclosed in Patent Document 2, there is concern that the waste will land on the cement clinker before the combustion is completed, causing abnormal cement clinker quality, such as whitening and increased free lime (f.CaO).

Given the above problems, an object of the present invention is to provide a combustible waste treatment method capable of suppressing the falling rate of even combustible waste having relatively poor combustibility into clinker during combustion while adopting the structure of a conventional main burner as it is.

Means for Solving the Problems

A combustible waste treatment method, according to the present invention includes: blowing first combustible waste having flammability into a kiln from a first waste burner disposed at a position vertically above a main burner blowing main fuel; and blowing second combustible waste having flame retardancy into the kiln from a second waste burner disposed at a position vertically above the first waste burner.

The term "combustible waste" in the present specification refers to combustible general waste and industrial waste mainly composed of organic substances such as waste plastic, wood chips, ASR, waste tires, carbon fiber, carbon fiber reinforced plastic (CFRP), meat-and-bone meal, or biomass, which are assumed to be used as auxiliary fuel together with powdered solid fuel (main fuel) such as pulverized coal. The term "biomass" refers to biologically derived organic resources that can be used as fuel other than fossil fuels, and corresponds to, for example, a pulverized product of waste tatami mats, a pulverized product of construction waste wood, wood flour, and sawdust and the like.

Among the combustible wastes exemplified above, for example, carbon fiber and CFRP have a fuel ratio (fixed carbon/volatile matter) greatly exceeding 1.0 and are inferior in combustibility to waste plastic and ASR. When such combustible waste having flame retardancy is blown into the kiln from an auxiliary burner disposed near the main burner, as described above, the combustible waste may fall onto the upper surface of the clinker before the combustion is completed, which is not preferable.

Meanwhile, when it is considered that an auxiliary burner is installed at a position separated from the main burner to some extent in a vertical direction and a large amount of combustible waste is charged from the auxiliary burner, the auxiliary burner serving as a heat source is positioned close to the inner wall of the kiln, and therefore a refractory brick formed on the inner wall of the kiln may be thermally worn. As a countermeasure against this, a method for changing the refractory brick itself to a refractory brick having higher heat resistance than that of a conventional refractory brick can be considered. However, since it is necessary to use a brick different from a brick conventionally used, there are inherent problems, such as increased installation cost and a narrower choice of a brick material, which may discourage the introduction of the auxiliary burner for increasing the treatment amount of combustible waste.

Meanwhile, according to the above method, the plurality of auxiliary burners are installed at positions vertically above the main burner. Among the plurality of auxiliary burners, the first waste burner disposed at a position closer to the main burner in the vertical direction blows waste (first combustible waste) having relatively good combustibility into the kiln, and the second waste burner disposed at a position farther from the main burner than the first waste burner in the vertical direction blows waste (second combustible waste) having relatively poor combustibility into the kiln.

Since the second waste burner is positioned vertically above the first waste burner, the second waste burner is placed at a sufficiently high position in the vertical direction based on the position of the main burner. Therefore, even when the second combustible waste exhibiting flame retardancy is blown, the second combustible waste can ensure a long floating time, and therefore the second combustible waste can be burned out before falling into the cement clinker in the kiln.

Meanwhile, the first combustible waste exhibiting flammability requires a shorter time to burn out than the second combustible waste exhibiting flame retardancy. Therefore, even when the first combustible waste is blown from the first waste burner, which is disposed closer to the main burner than the second waste burner in the vertical direction, the first combustible waste can be burned out before falling into the cement clinker.

The second waste burner is configured to blow only the second combustible waste exhibiting flame retardancy among the combustible wastes to be treated. Therefore, when the cases where both the combustible wastes are blown without distinction are compared with each other, the amount of the combustible waste blown through the second waste burner is reduced, and therefore the temperature rise is suppressed. As a result, the temperature rise of the inner wall of the kiln close to the second waste burner is suppressed, and therefore the refractory brick conventionally used can be continuously used.

The first combustible waste may be waste having a resin ratio of 60% by mass or more, and the second combustible waste may be waste having a resin ratio of less than 60% by mass.

Combustible waste having a particle size exceeding 20 mm tends to take time to burn out and thus may be handled as the second combustible waste. More specifically, those having a passage rate through a 20 mm sieve of less than 80% by mass may be handled as the second combustible waste.

When viewed in the axial direction of the kiln, the respective axial center positions of the first waste burner and the second waste burner may be positioned in a region between a first reference line extended in a vertical direction from the axial center position of the main burner and a second reference line obtained by rotating the first reference line around the axial center position of the main burner by 60° in a direction opposite to the rotation direction of the kiln.

By adopting the above aspect, the floating time of the combustible waste is secured along with the swirling flow of the gas in the kiln, and therefore the probability that the combustible waste is burned out before landing on the cement clinker is further increased.

The main burner may blow the first combustible waste from the inside of the blowing portion of the main fuel.

This makes it possible to increase the treatable amount of the combustible waste without changing the design of the main burner.

Effect of the Invention

According to the present invention, the treatment amount of the combustible waste can be increased without increasing the size of the main burner. In particular, even the combustible waste having relatively poor flammability can reduce the rate of falling into the burning cement clinker before burning out.

MODE FOR CARRYING OUT THE INVENTION

Figure 1:
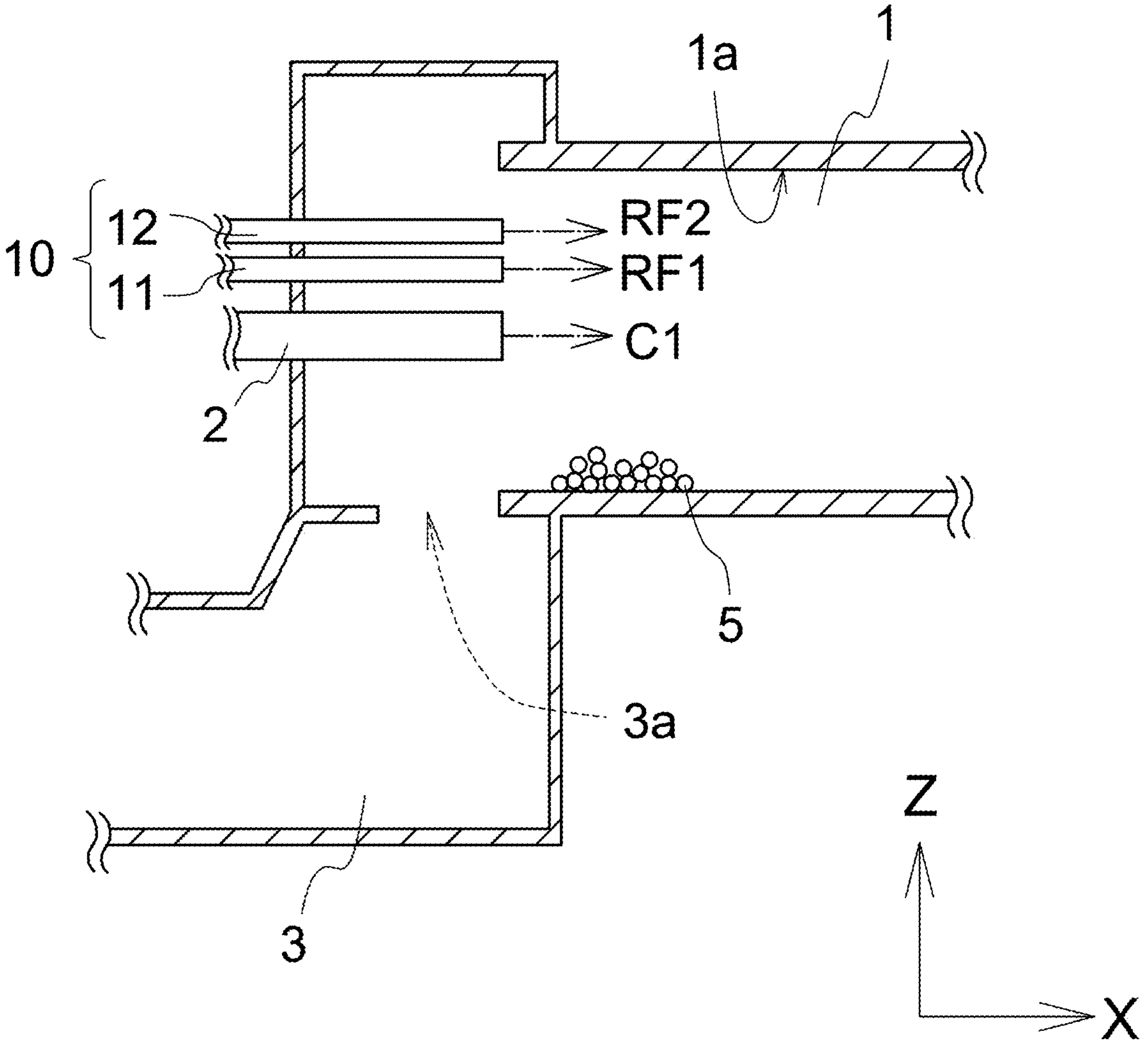
FIG. 1 is a schematic cross-sectional view of an embodiment of a combustion apparatus using a treatment method of the present invention.

Hereinafter, an embodiment of a combustible waste treatment method of the present invention will be described with reference to the drawings. Incidentally, the drawings that will be described later are schematically illustrated, and dimension ratios in the drawings are not coincident with actual dimension ratios. The dimension ratios do not necessarily coincide between the drawings.

FIG. 1 is a schematic cross-sectional view of an embodiment of a combustion apparatus using a treatment method of the present invention. A main burner 2 for charging main fuel such as pulverized coal from a kiln front side and an auxiliary burner 10 for charging combustible waste (RF1, RF2) from the kiln front side are installed in a rotary kiln 1 for calcining a cement clinker 5. The calcined cement clinker 5 falls into a clinker cooler 3 and is cooled.

Figure 2:
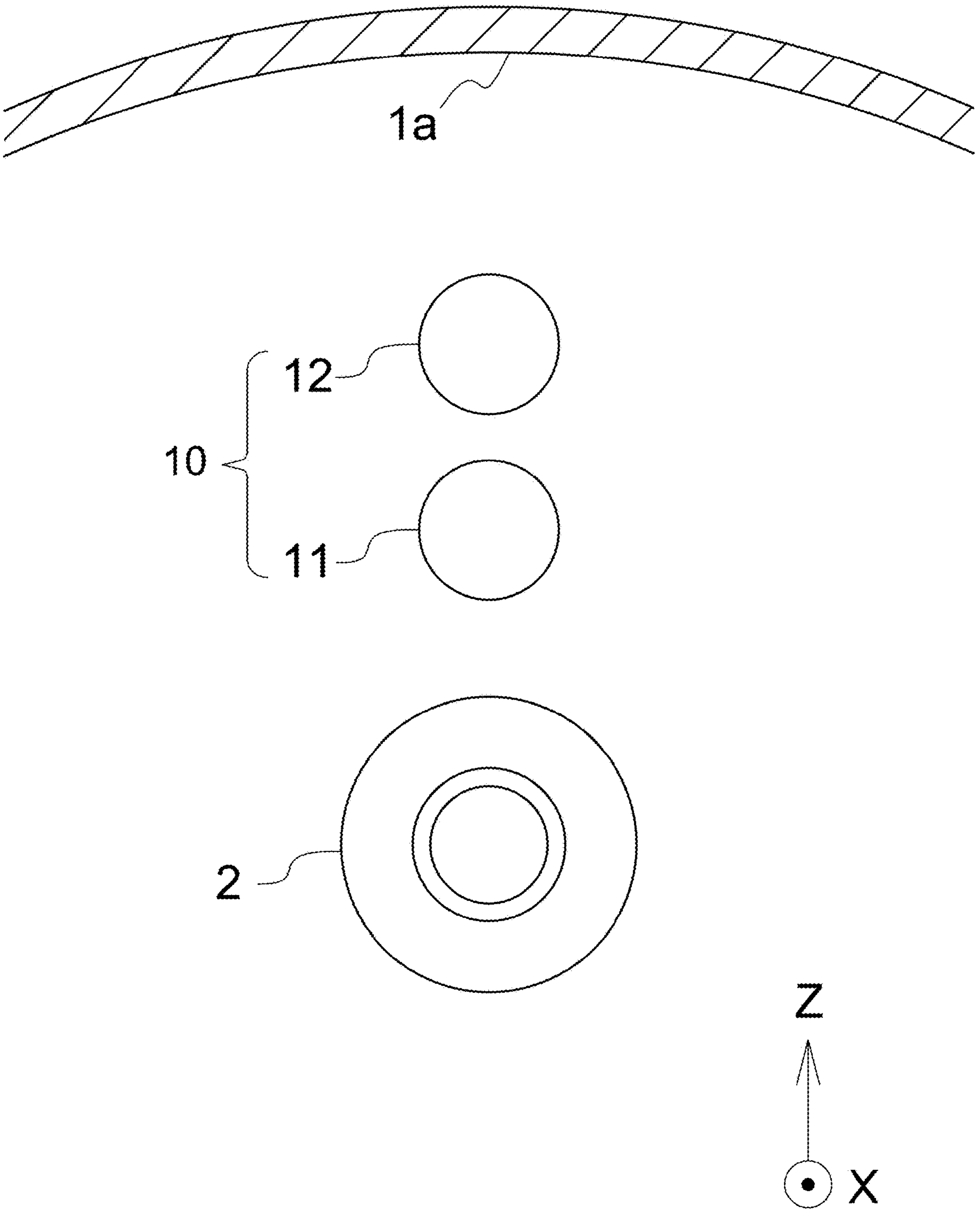
FIG. 2 is a schematic plan view of the tip surface of each burner (2, 10, 11) shown in FIG. 1 as viewed from a +X side.

In the following description, a vertical direction is defined as a Z direction, and the axial direction of the rotary kiln 1 is defined as an X direction. FIG. 2 is a schematic plan view of the tip surface of each burner (2, 10, 11) shown in FIG. 1 as viewed from a +X side.

As shown in FIGS. 1 and 2, the auxiliary burner 10 is positioned vertically above (+Z side) the main burner 2. The auxiliary burner 10 includes a first waste burner 11 disposed at a position closer to the main burner 2 in the vertical direction (Z direction), and a second waste burner 12 disposed at a position farther from the main burner 2 than the first waste burner 11 in the Z direction. That is, the second waste burner 12 is installed at a position close to an inner wall 1*a* of the rotary kiln 1.

From the first waste burner 11, combustible waste (first combustible waste RF1) with relatively good combustibility, i.e., with flammability, is blown into the rotary kiln 1. Meanwhile, from the second waste burner 12, combustible waste (second combustible waste RF2) with lower flammability than that of the first combustible waste RF1, i.e., with flame retardancy, is blown into the rotary kiln 1.

The first combustible waste RF1 exhibiting flammability may be, for example, waste having a resin ratio of 60% by mass or more or waste having a fuel ratio of less than 1.0. However, even when these conditions are met, waste having a large particle size may take a relatively long time to burn out and thus may be treated as the second combustible waste RF2 exhibiting flame retardancy. Specific examples of the first combustible waste RF1 include combustible waste mainly composed of organic substances such as waste plastic, wood chips, ASR, waste tires, waste tatami mats, meat-and-bone meal, or biomass.

The second combustible waste RF2 exhibiting flame retardancy may be, for example, waste having a resin ratio of less than 60% by mass or waste having a fuel ratio of more than 1.0. Examples of the second combustible waste RF2 exhibiting flame retardancy include carbon fiber and CFRP. As described above, a material having an extremely large particle size may be treated as the second combustible waste RF2. Typically, a material having a passage rate of less than 80% by mass through a 20 mm sieve may be treated as the second combustible waste RF2.

By blowing the second combustible waste RF2 having flame retardancy into the rotary kiln 1 from a high position in the Z direction, the floating time of the second combustible waste RF2 in the rotary kiln 1 can be secured. As a result, even when the second combustible waste RF2 is flame-retardant, the second combustible waste RF2 can be burned out before landing on the surface of the cement clinker 5. Meanwhile, even when the first combustible waste RF1 with flammability is charged into the rotary kiln 1 from a position lower than the second combustible waste RF2, the first combustible waste RF1 can be burned out before landing on the surface of the cement clinker 5.

When the combustible waste (RF1, RF2) to be received as an auxiliary fuel for calcining the cement clinker 5 is received and information on the resin ratio and the fuel ratio is provided, whether the combustible waste is the first combustible waste RF1 or the second combustible waste RF2 is identified based on this information, and the auxiliary burners (11, 12) to be charged are determined. When the information is not provided at the time of acceptance, for example, in a cement factory where the rotary kiln 1 is installed, the resin ratio may be measured by measuring the mixing rate of components other than the resin by manual selection and using component analysis by various instrument analysis, and the like. In the cement factory, the particle size may be measured by passing through a sieve, or the fuel ratio may be calculated by measuring fixed carbon and a volatile matter based on JIS M 8812 "Coals and Cokes-Industrial Analysis Method."

From the second waste burner 12 positioned near the inner wall 1*a* of the rotary kiln 1, only the second combustible waste RF2 with flame retardancy in the combustible waste is charged. As a result, the flow rate of the combustible waste charged from the second waste burner 12 can be suppressed within a certain amount, and therefore an excessive temperature rise of the inner wall 1*a* of the rotary kiln 1 is not caused. Therefore, a conventional refractory brick can be used as it is as the inner wall 1*a* of the rotary kiln 1.

Figure 3:
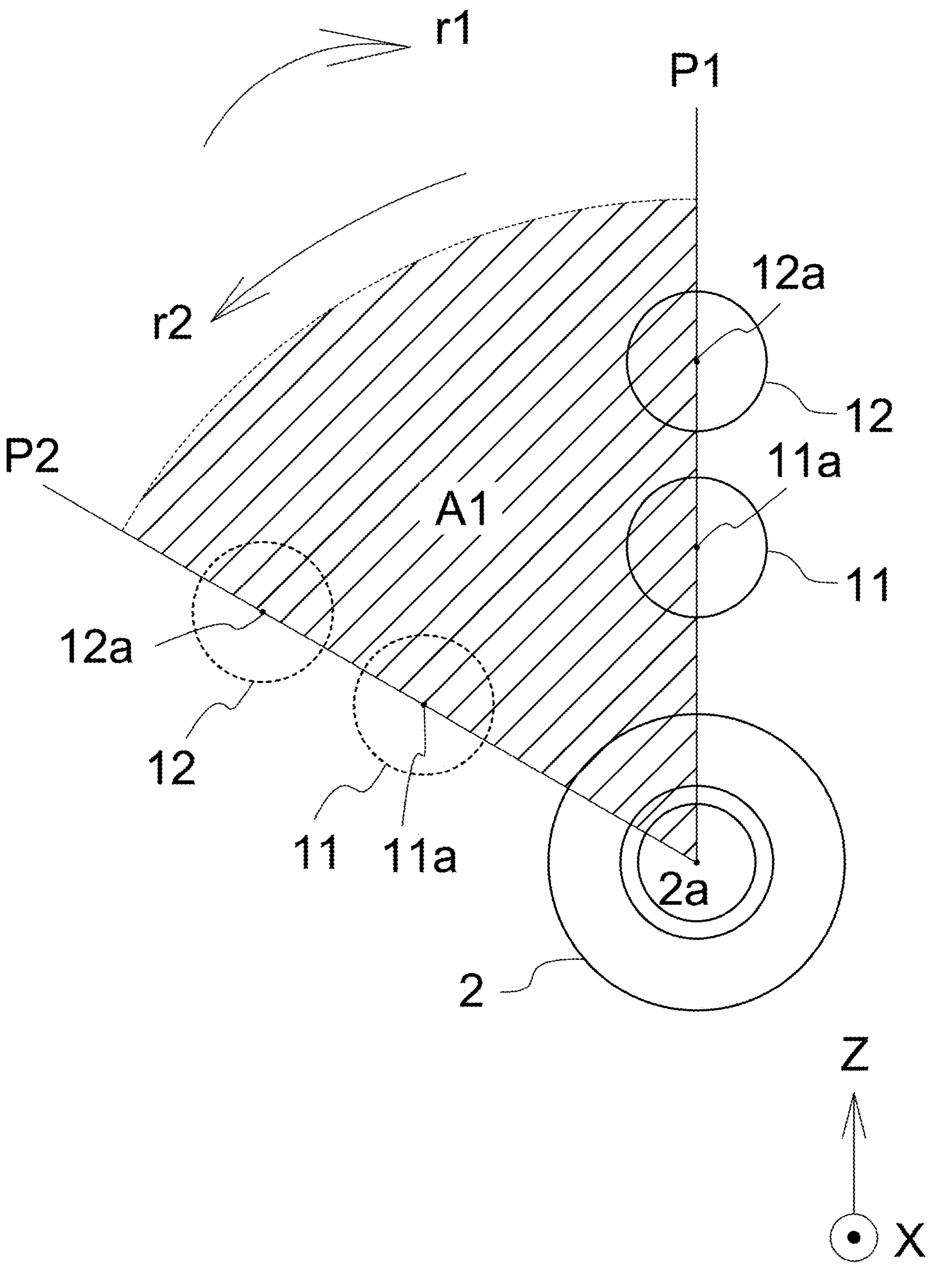
FIG. 3 is a schematic view for explaining the installable positions of a first waste burner and a second waste burner.

FIG. 3 is a schematic view for explaining the installable position of the auxiliary burner 10 (11, 12), and is a plan view as viewed from the X direction (the axial direction of the rotary kiln 1), as in FIG. 2.

An axial center 11*a* of the first waste burner 11 may be present in a region A1 sandwiched between a first reference line P1 extending in the vertical direction (Z direction) from an axial center 2*a* of the main burner 2 and a second reference line P2 obtained by rotating the first reference line P1 about the axial center 2*a* of the main burner 2 by 60° in a rotation direction r2 opposite to a rotation direction r1 of the rotary kiln 1. Similarly, an axial center 12*a* of the second waste burner 12 may be present in the region A1.

By installing the first waste burner 11 and the second waste burner 12 such that the axial center 11*a* and/or the axial center 12*a* are positioned in the region A1, it is possible to float the combustible waste (RF1, RF2) along a swirling flow in the rotary kiln 1. As a result, the floating time of the combustible waste (RF1, RF2) is further secured, and therefore the rate of the combustible waste landing on the cement clinker 5 before burning out can be further reduced.

In the embodiment described above, the auxiliary burner 10 includes two burners of the first waste burner 11 and the second waste burner 12, but the present invention does not exclude a case where three or more burners are provided. Even when the auxiliary burner 10 includes three or more burners, the first combustible waste RF1 having flammability is blown from the burner on the side close to the main burner 2 in the vertical direction, and the second combustible waste RF2 having flame retardancy is blown from the burner positioned on the side far from the main burner 2 in the vertical direction, that is, the burner positioned vertically above.

Examples

When the properties of waste charged from a first waste burner 11 and a second waste burner 12 were made different, combustion simulation was performed on the influence on the falling rate of the waste and a temperature in the vicinity of an inner wall 1*a* of a rotary kiln 1. The conditions of the simulation will be described below.

Figure 4:
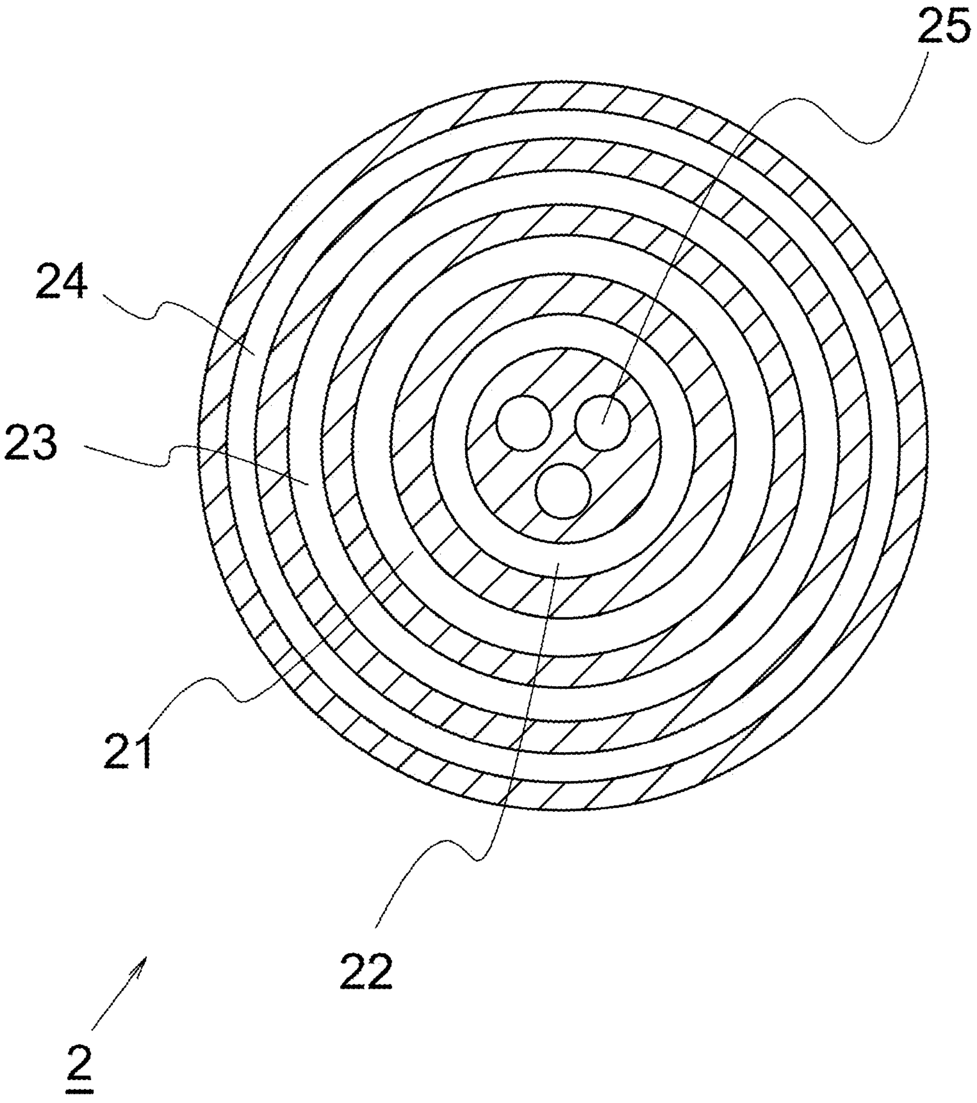
FIG. 4 is a cross-sectional view showing the tip structure of a main burner assumed in the simulation.

FIG. 4 is a cross-sectional view showing the tip structure of a main burner 2 assumed in simulation. The cross-sectional view corresponds to a sectional view taken along a plane orthogonal to the axis of the main burner 2.

The main burner 2 includes a flow channel 21 for main fuel such as pulverized coal, a first airflow channel 22 that is disposed adjacent to and inside the flow channel 21 for main fuel and forms a swirl air flow, a second airflow channel 23 that is disposed adjacent to and outside the flow channel 21 for main fuel and forms a swirl air flow, a third airflow channel 24 that is disposed adjacent to and outside the second airflow channel 23 and forms a straight airflow, and a flow channel 25 for waste plastic that is disposed inside the first airflow channel 22.

Figure 5A:
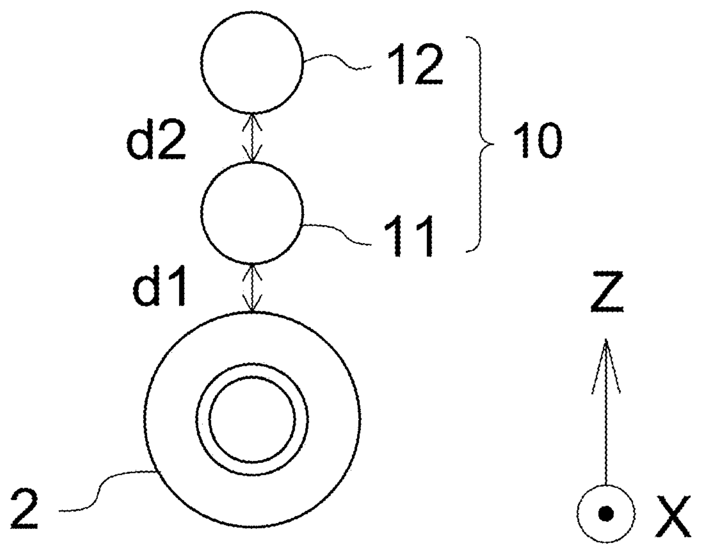
FIG. 5A is a view schematically illustrating the positional relationship between a main burner, a first waste burner, and a second waste burner assumed by Comparative Examples 1 to 4 and Example 1, in accordance with FIG. 2.
Figure 5B:
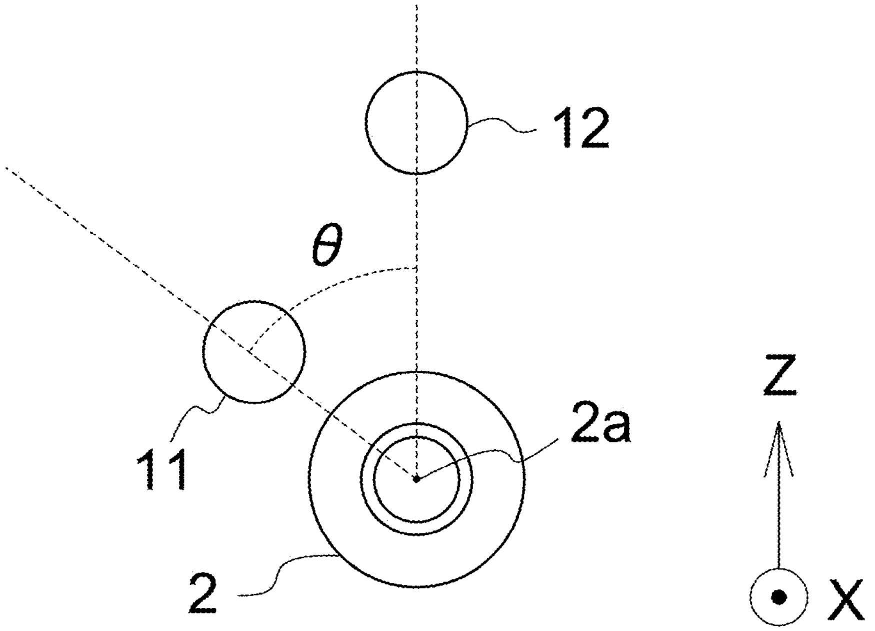
FIG. 5B is a view schematically illustrating the positional relationship between a main burner, a first waste burner, and a second waste burner assumed by Example 2, in accordance with FIG. 5A.
Figure 5C:
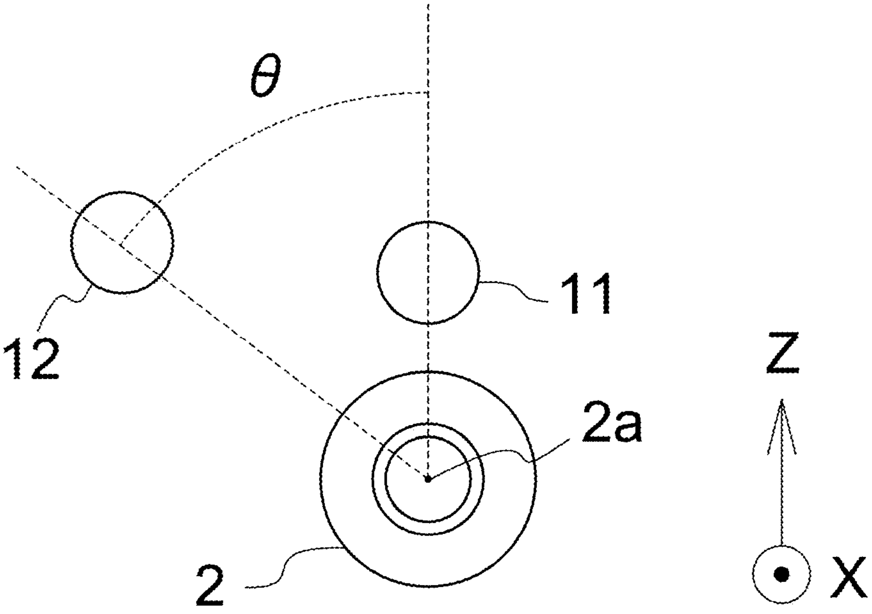
FIG. 5C is a view schematically illustrating the positional relationship between a main burner, a first waste burner, and a second waste burner assumed by Example 3, in accordance with FIG. 5A.
Figure 5D:
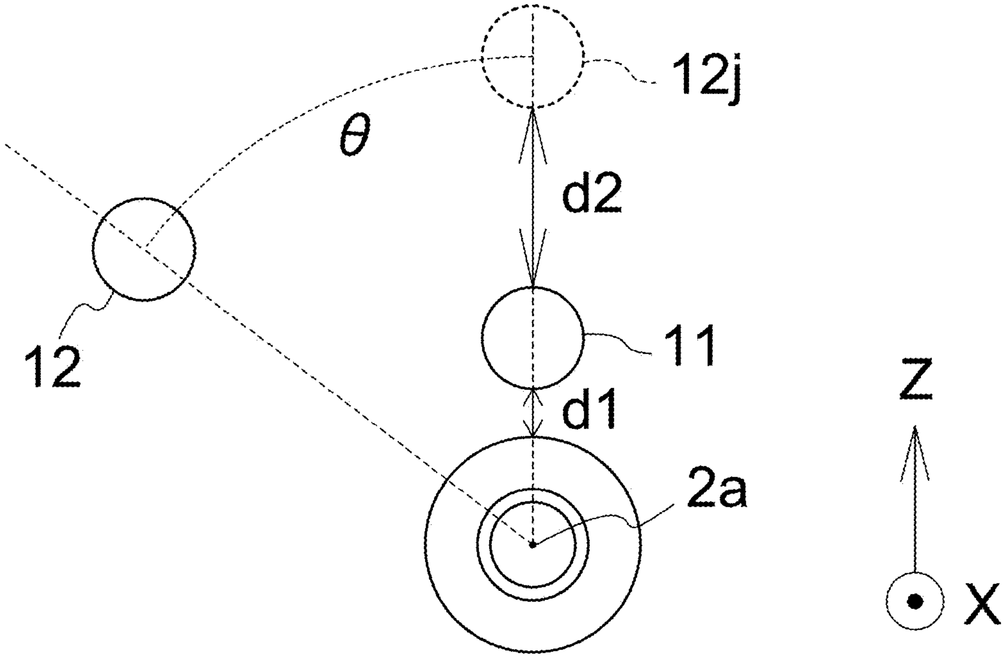
FIG. 5D is a view schematically illustrating the positional relationship between a main burner, a first waste burner, and a second waste burner assumed by Example 4, in accordance with FIG. 5A.

FIG. 5A is a view schematically illustrating the positional relationship between the main burner 2 and an auxiliary burner 10 assumed by Comparative Examples 1 to 4 and Example 1, in accordance with FIG. 2. FIGS. 5B to 5D are views schematically illustrating the positional relationship between the main burner 2 and the auxiliary burner 10 assumed by Examples 2 to 4, in accordance with FIG. 5A.

However, as described later with reference to Table 2, Comparative Example 1 corresponds to a configuration in which no waste (RF1. RF2) is charged from the auxiliary burner 10 and substantially no auxiliary burner 10 is provided. Comparative Example 2 is an aspect in which waste (RF1, RF2) is charged only from the second waste burner 12 in the auxiliary burner 10, and Comparative Example 3 is an aspect in which waste (RF1. RF2) is charged only from the first waste burner 11 in the auxiliary burner 10. That is, Comparative Example 2 and Comparative Example 3 substantially correspond to a configuration including a single burner as the auxiliary burner 10.

The rotary kiln 1 assumed in the simulation had an inner diameter of 5 m and an axial length of 100 m. The primary air ratios of Comparative Examples 1 to 4 and Examples 1 to 4 were set as shown in Table 1.

TABLE 1

| | | Reference numeral | Comparative Example 1 | Comparative Example 2 | Comparative Example 3 | Comparative Example 4 | Example 1 | Example 2 | Example 3 | Example 4 |
|---|---|---|---|---|---|---|---|---|---|---|
| Main burner | Waste plastic flow | 25 | 2% | 2% | 2% | 2% | 2% | 2% | 2% | 2% |
| | Main fuel flow | 21 | 2% | 2% | 2% | 2% | 2% | 2% | 2% | 2% |
| | Swirling inner flow | 22 | 2% | 2% | 2% | 2% | 2% | 2% | 2% | 2% |
| | Swirling outer flow | 23 | 4% | 4% | 4% | 4% | 4% | 4% | 4% | 4% |
| | Straight outer flow | 24 | 3% | 3% | 3% | 3% | 3% | 3% | 3% | 3% |
| Auxiliary burner | First waste flow | 11 | — | — | 2% | 1% | 1% | 1% | 1% | 1% |
| | Second waste flow | 12 | — | 2% | — | 1% | 1% | 1% | 1% | 1% |
| Total of primary air ratios [%] | | | 13% | 15% | 15% | 15% | 15% | 15% | 15% | 15% |

Fuels (main fuel, combustible waste) were charged from the main burner 2 and the auxiliary burner 10 (11, 12) in amounts shown in Table 2 below at the primary air ratios set under conditions shown in Table 1, and the falling rate of the combustible waste and the temperature in the vicinity of the inner wall 1*a* of the rotary kiln 1 (in the vicinity of a brick) were calculated by the simulation. As secondary air conditions, an air volume was set to 1800 $Nm^3$/min, and a gas temperature was set to 800° C. In the simulation, the software FLUENT ver. 2019R2 manufactured by ANSYS was used.

As the first combustible waste RF1 with flammability, a 15-mm square waste plastic (flammable waste plastic) sheet having a thermal deformation temperature of 80° C. and a thickness of 1 mm was employed. When the waste plastic is caused to pass through a 20 mm sieve, the waste plastic passes through the sieve at a rate of 80% by mass or more and is thus classified as flammable waste. Meanwhile, as the second combustible waste RF2 with flame retardancy, a 30-mm square waste plastic (flame-retardant waste plastic) sheet having a thermal deformation temperature of 80° C. and a thickness of 1 mm was employed. When the waste plastic is caused to pass through a 20 mm sieve, most of the waste plastic does not pass through the sieve, and therefore it takes time to burn out the waste plastic, and the waste plastic is classified as flame-retardant waste.

The simulation results are shown in Table 2.

TABLE 2

| | | | Comparative Example 1 | Comparative Example 2 | Comparative Example 3 | Comparative Example 4 | Example 1 | Example 2 | Example 3 | Example 4 |
|---|---|---|---|---|---|---|---|---|---|---|
| Main burner 2 | Amount of main fuel | T/h | 15.0 | 10.9 | 10.9 | 10.9 | 10.9 | 10.9 | 10.9 | 10.9 |
| | Amount of flammable waste plastic | T/h | 2.0 | 2.0 | 2.0 | 2.0 | 2.0 | 2.0 | 2.0 | 2.0 |
| | Amount of flame-retardant waste plastic | T/h | 0.0 | 0.0 | 0.0 | 0.0 | 0.0 | 0.0 | 0.0 | 0.0 |
| First waste burner 11 | Amount of flammable waste plastic | T/h | 0.0 | 0.0 | 2.0 | 1.0 | 2.0 | 2.0 | 2.0 | 2.0 |
| | Amount of flame-retardant waste plastic | T/h | 0.0 | 0.0 | 2.0 | 1.0 | 0.0 | 0.0 | 0.0 | 0.0 |
| | Angle θ from position vertically above main burner | Degree | 0 | 0 | 0 | 0 | 0 | 60 | 0 | 0 |
| | Distance from main burner d1 | Mm | 150 | 150 | 150 | 150 | 150 | 150 | 150 | 150 |
| Second waste burner 12 | Amount of flammable waste plastic | T/h | 0.0 | 2.0 | 0.0 | 1.0 | 0.0 | 0.0 | 0.0 | 0.0 |
| | Amount of flame-retardant waste plastic | T/h | 0.0 | 2.0 | 0.0 | 1.0 | 2.0 | 2.0 | 2.0 | 2.0 |
| | Angle θ from position vertically above main burner | Degree | 0 | 0 | 0 | 0 | 0 | 0 | 60 | 60 |
| | Distance from first waste burner d2 | Mm | 150 | 150 | 150 | 150 | 150 | 150 | 150 | 300 |
| Amount of heat charged in front of kiln | | Gj/h | 476 | 476 | 476 | 476 | 476 | 476 | 476 | 476 |
| Falling rate of waste plastic | | % | 0.2 | 0.5 | 8.8 | 5.1 | 1.2 | 0.9 | 0.0 | 0.0 |
| Maximum temperature near brick | | ° c. | 1755 | 1949 | 1764 | 1872 | 1810 | 1817 | 1776 | 1799 |
| Comprehensive evaluation | | | — | C | C | D | A | A | A+ | A+ |

As described above, in Comparative Example 1, no waste plastic is charged from both the first waste burner 11 and the second waste burner 12. Therefore, the falling rate of the waste plastic is low, and the maximum temperature near the brick is also 1850° C. or lower. However, the specification of this method is the same as that of the related art; therefore, the amount of the waste plastic (the amount of the combustible waste) that can be treated is small, and the treatment capacity of the combustible waste is not improved.

In all of Comparative Examples 2 to 4 and Examples 1 to 4, the total flow rate of the waste plastics charged from the auxiliary burners (the first waste burner 11 and the second waste burner 12) is made common (4.0 t/h).

Comparative Example 2 corresponds to a case where the waste plastic is not charged from the first waste burner 11, and each of the flammable waste plastic and the flame-retardant waste plastic is charged from the second waste burner 12 at a flow rate of 2.0 t/h. Contrary to Comparative Example 2, Comparative Example 3 corresponds to a case where the waste plastic is not charged from the second waste burner 12 and each of the flammable waste plastic and the flame-retardant waste plastic is charged from the first waste burner 11 at a flow rate of 2.0 t/h.

When Comparative Example 2 and Comparative Example 3 are compared with each other, it can be confirmed that in Comparative Example 2, in which the waste plastic is charged from the second waste burner 12 positioned on an upper side in a vertical direction, the falling rate of the waste plastic is significantly reduced as compared with Comparative Example 3. According to Comparative Example 2, it is considered that the floating time of the flame-retardant waste plastic can be secured as compared with Comparative Example 3.

However, in the case of Comparative Example 2, the maximum temperature near the brick is higher than 1900° C., which is extremely higher than that in Comparative Example 3. In the case of Comparative Example 2, it is considered that each of the flammable waste plastic and the flame-retardant waste plastic is charged at a flow rate of 2.0 t/h; that is, the waste plastics are charged at a total flow rate of 4.0 t/h, from a position considerably vertically above the main burner 2, and therefore a high-temperature heat source is present near the inner wall in the rotary kiln 1, and the temperature is higher than that in Comparative Example 1 and Comparative Example 3. In this case, when the conventional refractory brick is used, the conventional refractory brick may be thermally worn at the high temperature.

That is, in the case of Comparative Example 2, the maximum temperature near the brick is too high, which is not preferable, and in the case of Comparative Example 3, the falling rate of the waste plastic is too high, which is not preferable. Based on this result, in Table 2, the comprehensive evaluations of Comparative Example 2 and Comparative Example 3 are indicated as “C”.

Comparative Example 4 corresponds to a case where flammable waste plastic and flame-retardant waste plastic are charged at a flow rate of 1.0 t/h from both the first waste burner 11 and the second waste burner 12. That is, Comparative Example 4 corresponds to a case where two burners (the first waste burner 11 and the second waste burner 12) are provided as the auxiliary burner 10 at different positions in the vertical direction, but the wastes charged from the burners are not distinguished.

In comparison with Comparative Example 3, in Comparative Example 4, both the falling rate of the waste plastic and the maximum temperature near the brick are increased, and both the factors are worse than those in Comparative Example 3. Based on this result, in Table 2, the comprehensive evaluation of Comparative Example 4 is indicated as “D” lower than “C.”

Example 1 corresponds to a case where, in the vertical direction (Z direction), flammable waste plastic is charged at a flow rate of 2.0 t/h from the first waste burner 11 installed at a position close to the main burner 2, and flame-retardant waste plastic is charged at a flow rate of 2.0 t/h from the second waste burner 12 positioned vertically above the first waste burner 11. According to Table 2, by charging the waste plastic by the method of Example 1, low values can be realized for both the falling rate of the waste plastic and the maximum temperature near the brick. Based on this result, in Table 2, the comprehensive evaluation of Example 1 is indicated as “A” higher than “C.”

Examples 2 to 4 correspond to cases where the properties and amounts of the waste plastics charged from both the first waste burner 11 and the second waste burner 12 are the same as those in Example 1, and only the relative positional relationship between the first waste burner 11 and the second waste burner 12 is changed. However, when viewed in the X direction (the axial direction of the rotary kiln 1), the rotation direction of the rotary kiln 1 is clockwise.

Example 2 is different from Example 1 in that the first waste burner 11 is installed at a position in which the first waste burner 11 is rotated by 60° in a rotation direction (counterclockwise in FIG. 5B) opposite to the rotation direction of the rotary kiln 1 about the axial center 2*a* of the main burner 2. According to Table 2, while the maximum temperature near the brick shows a value substantially equivalent to that in Example 1, a further lower value of the falling rate of the waste plastic can be realized.

Example 3 is different from Example 1 in that the second waste burner 12 is installed at a position in which the second waste burner 12 is rotated by 60° in a rotation direction (counterclockwise in FIG. 5C) opposite to the rotation direction of the rotary kiln 1 about the axial center 2*a* of the main burner 2. According to Table 2, as compared with Example 1, values lower than those of Example 1 can be realized for both the maximum temperature near the brick and the falling rate of the waste plastic. Based on this result, in Table 2, the comprehensive evaluation of Example 3 is indicated as "A+" higher than "A".

By installing the second waste burner 12 positioned vertically above at a position in which the second waste burner 12 is rotated in a direction opposite to the rotation direction of the rotary kiln 1, the coordinate position of the second waste burner 12 in the +Z direction is slightly closer to the main burner 2 side than in Example 1. As a result, it is estimated that the second waste burner 12 as a heat source is slightly away from the inner wall 1*a* of the rotary kiln 1, and the maximum temperature near the brick is lower than that in Example 1.

The second waste burner 12 is installed at a position in which the second waste burner 12 is rotated in a direction opposite to the rotation direction of the rotary kiln 1, and therefore the flame-retardant waste plastic (corresponding to the second combustible waste RF2) blown from the second waste burner 12 easily floats on a swirling flow in the rotary kiln 1. As a result, it is estimated that the value of the falling rate is further decreased as compared with Example 1 as a ratio at which burning can be completed before landing is further increased. In Table 2, the falling rate of the waste plastic was 0.0%, and the burning out of the waste plastic was confirmed before falling.

Example 4 is different from Example 3 in that the second waste burner 12 is separated from the first waste burner 11 to the +Z side (corresponding to reference numeral 12*j* in FIG. 5D) and then installed at a position in which the second waste burner 12 is rotated by 60° in a direction (counterclockwise in FIG. 5D) opposite to the rotation direction of the rotary kiln 1 about the axial center 2*a* of the main burner 2. According to Table 2, the falling rate of 0.0% could be realized as in Example 3, but the maximum temperature near the brick was slightly higher than that in Example 3. However, the maximum temperature near the brick in Example 4 can be sufficiently lowered as compared with Examples 1 and 2, and therefore the comprehensive evaluation of Example 4 is indicated as "A+" as in Example 3 in Table 2.

In Example 4, the second waste burner 12 is positioned vertically above as compared with that in Example 3, and as a result of being slightly closer to the inner wall 1*a* of the rotary kiln 1, the maximum temperature near the brick is estimated to slightly higher than that in Example 3. From the results of Examples 3 to 4, it can be seen that the falling rate of the waste plastic can be sufficiently reduced even if the second waste burner 12 for blowing the second combustible waste RF2 having flame retardancy is not separated from the first waste burner 11 more than necessary.

DESCRIPTION OF REFERENCE SIGNS

1 Rotary kiln
1*a* Inner wall of rotary kiln
2 Main burner
2*a* Axial center of main burner
3 Clinker cooler
5 Cement clinker
10 Auxiliary burner
11 First waste burner
11*a* Axial center of first waste burner
12 Second waste burner
12*a* Axial center of second waste burner
21 Flow channel for main fuel
22 First air Flow channel
23 Second air flow channel
24 Third air flow channel
25 Flow channel for waste plastic
P1 First reference line
P2 Second reference line
RF1 First combustible waste
RF2 Second combustible waste

What is claimed is:

1. A combustible waste treatment method comprising:
blowing first combustible waste having flammability into a kiln from a first waste burner disposed at a position vertically above a main burner blowing main fuel; and
blowing second combustible waste having flame retardancy into the kiln from a second waste burner disposed at a position vertically above the first waste burner,
wherein the second combustible waste is waste which satisfies at least one condition selected from: a resin ratio of less than 60% by mass, a fuel ratio of more than 1.0, and a passage rate through a 20 mm sieve of less than 80% by mass, and
wherein the first combustible waste is combustible waste other than the second combustible waste.

2. The method according to claim 1, wherein the first combustible waste is waste having a resin ratio of 60% by mass or more, and the second combustible waste is waste having a resin ratio of less than 60% by mass.

3. The method according to claim 2, wherein, when viewed in an axial direction of the kiln, respective axial center positions of the first waste burner and the second waste burner are positioned in a region between a first reference line extended in a vertical direction from an axial center position of the main burner and a second reference line obtained by rotating the first reference line around the axial center position of the main burner by 60° in a direction opposite to a rotation direction of the kiln.

4. The method according to claim 3, wherein the main burner blows the first combustible waste from an inner side of a blowing portion of the main fuel.

5. The method according to claim 2, wherein the main burner blows the first combustible waste from an inner side of a blowing portion of the main fuel.

6. The method according to claim 1, wherein, when viewed in an axial direction of the kiln, respective axial center positions of the first waste burner and the second waste burner are positioned in a region between a first reference line extended in a vertical direction from an axial center position of the main burner and a second reference line obtained by rotating the first reference line around the axial center position of the main burner by 60° in a direction opposite to a rotation direction of the kiln.

7. The method according to claim 6, wherein the main burner blows the first combustible waste from an inner side of a blowing portion of the main fuel.

8. The method according to claim 1, wherein the main burner has a plurality of flow channels including a first flow channel and a second flow channel, the first flow channel and the second flow channel being disposed at positions different in radial distance from an axial center of the main burner, wherein the main burner blows the first combustible waste together with the main fuel, and wherein the main fuel is blown into the kiln through the first flow channel, and the first combustible waste is blown into the kiln through the second flow channel, the second flow channel being disposed at a position closer to the axial center than the first flow channel.

* * * * *